United States Patent
Knebel et al.

(10) Patent No.: US 10,162,409 B2
(45) Date of Patent: Dec. 25, 2018

(54) LOCATING A HEAD MOUNTED DISPLAY IN A VEHICLE

(71) Applicant: Bayerische Motoren Werke Aktiengesellschaft, Munich (DE)

(72) Inventors: Karsten Knebel, Munich (DE); Matthias Roland Kaufmann, Unterschleissheim (DE); Wolfgang Spiessl, Pfaffenhofen (DE); Wolfgang Haberl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 19 days.

(21) Appl. No.: 15/396,856

(22) Filed: Jan. 3, 2017

(65) Prior Publication Data

US 2017/0115730 A1    Apr. 27, 2017

Related U.S. Application Data

(63) Continuation of application No. PCT/EP2015/064501, filed on Jun. 26, 2015.

(30) Foreign Application Priority Data

Jul. 4, 2014    (DE) .................. 10 2014 213 021

(51) Int. Cl.
*G09G 5/00*      (2006.01)
*G06F 3/033*     (2013.01)
*G09G 5/08*      (2006.01)
*G06F 3/041*     (2006.01)
(Continued)

(52) U.S. Cl.
CPC ............ *G06F 3/012* (2013.01); *B60R 1/00* (2013.01); *G02B 27/017* (2013.01);
(Continued)

(58) Field of Classification Search
CPC ........................ G06F 1/163; G06K 9/00798
See application file for complete search history.

(56) References Cited

U.S. PATENT DOCUMENTS

| 2004/0189631 A1 | 9/2004 | Kazi et al. |
| 2005/0021281 A1 | 1/2005 | Friedrich et al. |
| (Continued) | | |

FOREIGN PATENT DOCUMENTS

| DE | 101 59 610 A1 | 7/2003 |
| DE | 102 56 589 A1 | 8/2004 |
| (Continued) | | |

OTHER PUBLICATIONS

International Search Report (PCT/ISA/210) issued in PCT Application No. PCT/EP2015/064501 dated Aug. 28, 2015 with English translation (Four (4) pages).

(Continued)

*Primary Examiner* — Nan-Ying Yang
(74) *Attorney, Agent, or Firm* — Crowell & Moring LLP

(57) ABSTRACT

A head mounted display is configured to determine the posture of the head mounted display relative to a vehicle. The head mounted display includes a display, a camera and an electronic computing unit; and is set up to: create recordings of the environment of the head mounted display with the aid of the camera; receive details relating to the position and/or orientation of a movable object in the interior of the vehicle; detect the image of the object in the recordings from the camera; and determine the posture of the head mounted display taking into account the image of the object in the recordings relative to the vehicle. The posture of the head mounted display indicates the position of the pair of data glasses and the alignment of the pair of data glasses.

8 Claims, 1 Drawing Sheet

(51) Int. Cl.
  *G06F 3/01* (2006.01)
  *G02B 27/01* (2006.01)
  *G06K 9/00* (2006.01)
  *G06T 7/73* (2017.01)
  *B60R 1/00* (2006.01)
  *G06F 3/00* (2006.01)

(52) U.S. Cl.
  CPC ..... *G02B 27/0172* (2013.01); *G02B 27/0179* (2013.01); *G06F 3/005* (2013.01); *G06K 9/00604* (2013.01); *G06K 9/00845* (2013.01); *G06T 7/75* (2017.01); *B60R 2300/20* (2013.01); *B60R 2300/8006* (2013.01); *G02B 2027/014* (2013.01); *G02B 2027/0138* (2013.01); *G02B 2027/0178* (2013.01); *G02B 2027/0183* (2013.01); *G02B 2027/0187* (2013.01); *G06T 2207/30244* (2013.01); *G06T 2207/30268* (2013.01)

(56) References Cited

U.S. PATENT DOCUMENTS

2007/0273610 A1* 11/2007 Baillot ................ G02B 27/017
                                                               345/8
2009/0167682 A1* 7/2009 Yamashita ............ G01C 21/36
                                                               345/158
2010/0295754 A1* 11/2010 Cernasov ................ G06F 3/012
                                                               345/8
2013/0050258 A1   2/2013 Liu et al.

FOREIGN PATENT DOCUMENTS

| | | |
|---|---|---|
| DE | 103 05 384 A1 | 8/2004 |
| DE | 10 2006 006 001 B3 | 10/2007 |
| DE | 10 2012 216 175 A1 | 5/2014 |
| EP | 2 254 023 A2 | 11/2010 |
| WO | WO 00/52563 A1 | 9/2000 |
| WO | WO 2013/012914 A2 | 1/2013 |

OTHER PUBLICATIONS

German-language Written Opinion (PCT/ISA/237) issued in PCT Application No. PCT/EP2015/064501 dated Aug. 28, 2015 (Five (5) pages).

German-language Search Report issued in counterpart German Application No. 10 2014 213 021.2 dated Jun. 17, 2015 with partial English translation (Fifteen (15) pages).

* cited by examiner

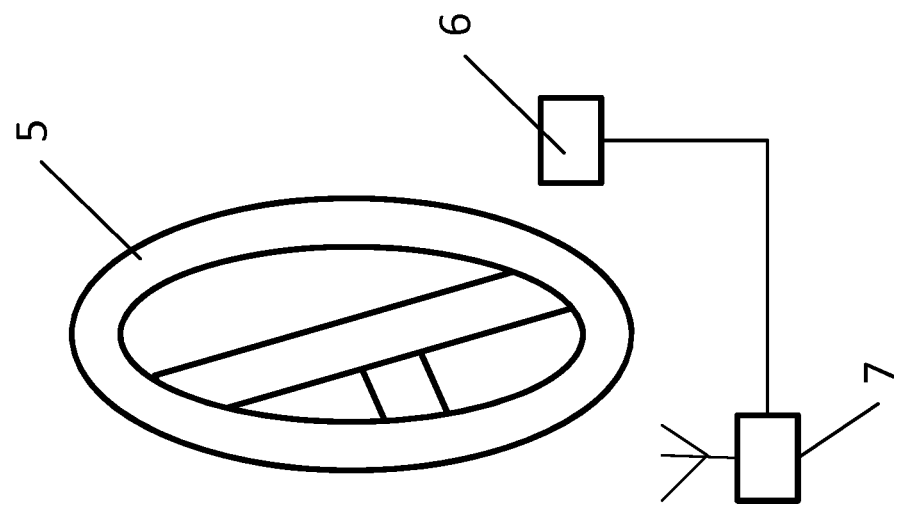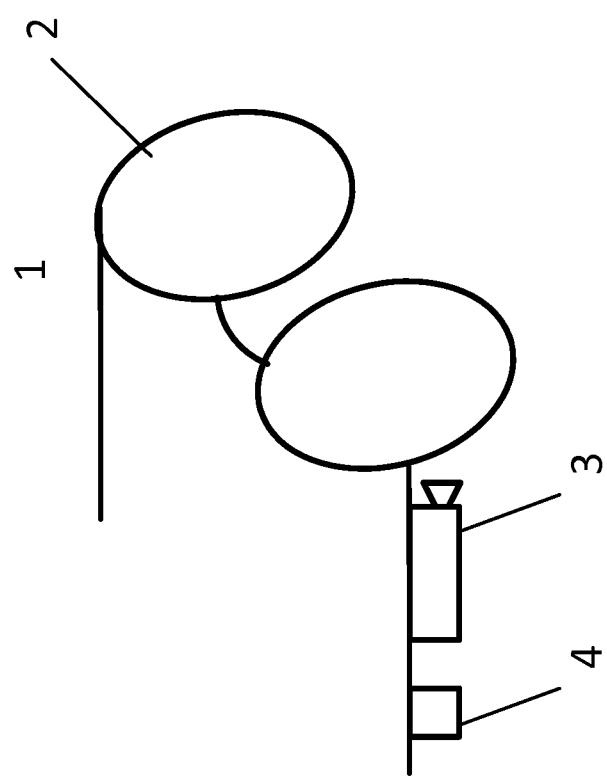

LOCATING A HEAD MOUNTED DISPLAY IN A VEHICLE

CROSS REFERENCE TO RELATED APPLICATIONS

This application is a continuation of PCT International Application No. PCT/EP2015/064501, filed Jun. 26, 2015, which claims priority under 35 U.S.C. § 119 from German Patent Application No. 10 2014 213 021.2, filed Jul. 4, 2014, the entire disclosures of which are herein expressly incorporated by reference.

BACKGROUND AND SUMMARY OF THE INVENTION

The invention relates to a head-mounted display (HMD) for determining the posture of the head-mounted display in a vehicle.

Nowadays, head-mounted displays (HMDs) are known which make it possible to display information to the wearer of the head-mounted display are known. The head-mounted display is here worn on the head like a normal pair of eyeglasses (spectacles) used as a vision aid. However, unlike a normal pair of spectacles, the head-mounted display includes a display which is arranged near the eye or eyes of the user when the head-mounted display is worn. The display can have two partial displays, one for each eye. Information in the form of text, graphical representations or mixtures thereof can be displayed to the user using the display. The display can, in particular, be partially transmissive, that is to say it can be configured such that the wearer can also see the environment behind the display. With particular preference, the information is displayed to the wearer in a contact analog fashion, which is sometimes also referred to as augmented reality. Here, the information is displayed to the wearer of the head-mounted display at a location which is oriented toward the location of an object in the environment, that is to say for example adjoining the object or overlaying the object. In order to implement the contact analog manner, typically the position of the object in the environment and the posture of the head-mounted display relative to the object must be known, that is to say the position of the head-mounted display and the alignment of the head-mounted display.

Head-mounted displays which likewise include in each case a camera which takes recordings in the viewing direction of the wearer of the head-mounted display have become known, see for example WO 2013/012914.

Head-mounted displays can also be used in vehicles to display contact analog information. Such information can relate to other traffic participants or objects within the vehicle. In order to be able to display contact analog information, in most cases the posture of the head-mounted display must also be known.

It is an object of the present invention to provide a method with which the posture of the head-mounted display can be determined and, based thereon, information can be displayed in contact analog fashion.

One aspect of the invention relates to a head-mounted display which is configured for determining the posture of the head-mounted display relative to a vehicle, wherein the head-mounted display includes a display and a camera, as well as an electronic computation device (e.g. a microprocessor). The apparatus is configured and executes processing for: taking recordings of the environment of the head-mounted display using the camera; receiving statements relating to the position and/or alignment of an object which is movable (relative to the vehicle's interior) of the interior of the vehicle (for example, wirelessly using Wi-Fi or Bluetooth standards); detecting the image of the object in the recordings of the camera; determining the posture of the head-mounted display by taking into consideration the image of the object in the recordings relative to the vehicle. The posture of the head-mounted display indicates the 3-D position of the head-mounted display and the 3-D alignment of the head-mounted display relative to the vehicle. Statements relating to the position of the object can be statements relating to the position of features of the object which are suitable for detecting and determining the position and posture of the head-mounted display. One object can be, for example, a steering wheel, a door or a lever.

What is proposed here in other words is the determination of the posture of the head-mounted display using movable objects of the vehicle, in particular a steering wheel, wherein the position and/or alignment of the object are known. Since the rotation (steering angle) and position (height and length setting) of a steering wheel change during operation of the vehicle, the steering wheel cannot, in accordance with the prior art, serve for determining the posture of the head-mounted display using camera recordings of the steering wheel. The invention provides that the steering angle and the position of the steering wheel are transmitted from the vehicle to the head-mounted display (for example, wirelessly using the Wi-Fi or Bluetooth standards). With this knowledge, the recordings of the steering wheel can be used to infer the posture of the head-mounted display. It may be possible for posture determination to also use the recordings of other stationary objects in the interior at the same time.

Using the received statements, the head-mounted display can establish a 3-D model of the movable object and use it for posture determination. The 3-D model of the object can be derived from a generic 3-D model on the basis of the statements relating to position and alignment of the object. Moreover, the head-mounted display can be provided with a 3-D model also of other parts of the interior of the vehicle.

In one implementation, the apparatus is furthermore configured and executes processing for: receiving statements relating to the change rate of the position and/or alignment of the object of the interior of the vehicle. Using these statements, the head-mounted display can determine the probable future position and alignment of the object. This is helpful primarily if there is a time period between the measurement time of the position and the alignment of the object and the determination of the posture of the head-mounted display of which it can be assumed that the position and alignment of the object change sufficiently strongly to significantly influence the posture determination.

The detection of the image of the object is typically carried out in dependence on the received statements relating to the position and/or alignment of the object. The detection can be carried out in this way more robustly and faster because of the previous knowledge with respect to the alignment and position of the object. The detection can be carried out using pattern recognition or a classifier. Here, the pattern recognition or the classifier is adapted to the statements relating to the position and/or alignment of the object.

The position of the steering wheel is typically obtained from the height and length setting of the steering wheel by the driver. The alignment of the steering wheel or its rotation is obtained from the steering angle, that is to say the rotation of the steering wheel about the steering axis.

In one implementation, the determination of the posture of the head-mounted display is carried out even with taking into consideration non-movable objects of the vehicle's interior. The posture determination is thus carried out based on a mix of static and dynamic features which are detected in each case on objects which are movable in the interior and objects which are static. A static object can be, for example, an instrument cluster, a display, a trim panel, a window frame, etc. These objects can be represented in a 3-D CAD model and serve for posture determination.

The 3-D CAD model can furthermore serve for identifying which regions of static objects can be concealed by movable objects. In this way, features of static objects can be used for posture determination even if the static objects are at least partially covered by movable objects. Here, the current (received) position and alignment of the respective movable object can be taken into consideration.

In one advantageous implementation, the apparatus is furthermore configured and executes processing for: checking whether a number of objects and/or features of objects which is sufficient for determining the posture is detectable in the recordings of the camera; if no sufficient number is detectable: carrying out the steps of receiving, detecting and determining. The above-illustrated methods can be used as alternative methods, if no sufficient number of static features (that is to say features which have been detected as spatially fixed) of the vehicle's interior are detected using the camera. Dynamic features are also taken into consideration (that is to say the detection of features of movable objects) only if the posture of the head-mounted display cannot be determined using the static features.

Another aspect of the invention relates to a method for determining the posture of a head-mounted display in a vehicle, wherein the head-mounted display includes a display, a camera and an electronic computation device; wherein the method comprises: taking recordings of the environment of the head-mounted display using the camera; receiving statements relating to the position and/or alignment of an object of the interior of the vehicle; detecting the image of the object in the recordings of the camera; determining the posture of the head-mounted display by taking into consideration the image of the object in the recordings; wherein the posture of the head-mounted display indicates the position of the head-mounted display and the alignment of the head-mounted display. The method is typically carried out by the head-mounted display.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 schematically shows an apparatus according to an exemplary embodiment.

DETAILED DESCRIPTION OF THE DRAWINGS

FIG. 1 schematically shows an apparatus according to an exemplary embodiment. The head-mounted display 1 includes two partial displays 2, one for the left eye and one for the right eye. The head-mounted display 1 furthermore includes a camera 3 and an electronic computation unit 4. What is not illustrated in FIG. 1 but is included with the head-mounted display 1 is an energy store (e.g. a battery) and a Wi-Fi module for wireless radio transmission. The head-mounted display is worn on the head like a typical vision aid, wherein the head-mounted display rests against the nose and the ears. The camera 3 is aligned in the viewing direction of the wearer (not illustrated) of the head-mounted display 1 and substantially records the field of vision of the wearer of the head-mounted display 1. The camera 3 continuously takes recordings, that is to say for example every 16 ms, in the visible range of light.

In the present example, the wearer of the head-mounted display is the driver of a vehicle. Also situated in the interior of the vehicle is the steering wheel 5 of the vehicle. The vehicle can determine the steering angle of the steering wheel via a sensor 6. The sensor 6 furthermore determines the height and length setting of the steering wheel. The sensor passes this data on to a control module 7. The control module 7 processes the sensor data and continuously transmits the steering angle (that is to say the alignment of the steering wheel) and the position of the steering wheel to the head-mounted display 1 via a wireless radio link (for example Wi-Fi). Provision may be made for the position of the steering wheel to be transmitted only at relatively large time intervals, that is to say not with every transmission of the steering angle.

Once, for example at the time of the first pairing of the vehicle and the head-mounted display 1 via the wireless radio link, a 3D CAD model of the vehicle's interior and, in particular, of the cockpit having the steering wheel, is communicated to the head-mounted display 1. Also described in this data was the manner in which the steering wheel can change its position and rotation.

This 3D model of the steering wheel and the statements regarding its position and rotation are now used by the head-mounted display to detect the steering wheel in the camera recordings. The head-mounted display can determine its posture relative to the vehicle on the basis of the knowledge of the current alignment and position of the steering wheel in the interior of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A head-mounted display configured to determine a posture of the head-mounted display relative to a vehicle, comprising:
   a display;
   a camera; and
   an electronic computation unit;
   wherein the electronic computation unit executes processing to:
      take recordings of an environment of the head-mounted display using the camera;
      receive statements relating to a position and/or an alignment of a movable object in an interior of the vehicle;
      detect an image of the movable object in the recordings of the camera; and
      determine the posture of the head-mounted display by taking into consideration the image of the movable object in the recordings relative to the vehicle, wherein the posture of the head-mounted display indicates the position of the head-mounted display and the alignment of the head-mounted display, wherein the electronic computation unit further executes processing to:
check whether a number of static features sufficient to determine the posture of the head-mounted display is detectable in the recordings of the environment of the camera; and
if an insufficient number of static features are detectable, performing said processing of receiving statements, detecting the image and determining the posture of the head-mounted display taking into consideration the image of the movable object in the recordings relative to the vehicle.

2. The head mounted display according to claim 1, wherein the electronic computation unit further executes processing to:
receive statements relating to a change rate of the position and/or the alignment of the movable object in the interior of the vehicle.

3. The head mounted display according to claim 1, wherein the detection of the image of the movable object is carried out in dependence on the received statements related to the position and/or the alignment of the movable object.

4. The head mounted display according to claim 3, wherein the detection of the image is carried out via pattern recognition, the pattern recognition being adapted to the received statements relating to the position and/or the alignment of the movable object.

5. The head mounted display according to claim 3, wherein the detection of the image is carried out via a classifier, the classifier being adapted to the received statements relating to the position and/or alignment of the movable object.

6. The head mounted display according to claim 1, wherein
the movable object is a steering wheel of the vehicle,
the position is a position of the steering wheel, and
the alignment is a steering angle of the steering wheel,
wherein the steering angle is a rotational orientation of the steering wheel about a steering wheel axis.

7. The head mounted display according to claim 1, wherein the determination of the posture of the head-mounted display further takes into consideration one or more non-movable objects in the interior of the vehicle.

8. A method of determining a posture of a head-mounted display in a vehicle, wherein the head-mounted display comprises a display, a camera and an electronic computation unit, the method comprising the acts of:
taking recordings of an environment of the head-mounted display using the camera;
checking whether a number of static features sufficient to determine the posture of the head-mounted display is detectable in the recordings of the environment of the camera;
if an insufficient number of static features are detectable, the method further comprises:
receiving statements relating to a position and/or an alignment of a movable object in an interior of the vehicle;
detecting an image of the movable object in the recordings of the environment taken using the camera and
determining the posture of the head-mounted display by taking into consideration the image of the movable object in the recordings, wherein the posture of the head-mounted display indicates the position of the head-mounted display and the alignment of the head-mounted display.

* * * * *